United States Patent Office 2,832,749
Patented Apr. 29, 1958

2,832,749
6-ETHER SUBSTITUTED 2,2,4-TRIALKYL-1,2,3,4-TETRAHYDROQUINOLINES

James O. Harris, St. Albans, W. Va., assignor to Monsanto Chemical Company, St. Louis, Mo., a corporation of Delaware No Drawing. Application September 10, 1952
Serial No. 308,913

12 Claims. (Cl. 260—45.8)

This invention relates to new and useful compositions of matter. More particularly it relates to 6-ether substituted-2,2,4-trialkyl-1,2,3,4-tetrahydroquinolines and to rubbery compositions containing same.

One of the major problems of the rubber industry is the protection of rubber (natural and synthetic) goods against exposure cracking, that is degradation due to ozone while the rubber article is under either static or dynamic stress. The problem is a difficult one and is aggravated by the fact that in general chemical antioxidants or age-retarders have little or no value in protecting against deterioration by ozone. Although many materials have been suggested, such as the various waxes, factice, cellulose and the like to prevent ozone from reaching the rubber surface, not one has been found entirely satisfactory. Accordingly rubber technologists have constantly sought improvements.

In accordance with this invention it has been found that 6-either substituted-2,2,4-trialkyl-1,2,3,4-tetrahydroquinolines of the general formula

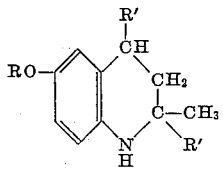

where R is a hydrocarbon radical such as methyl, ethyl, propyl, isopropyl, butyl, amyl, octyl, dodecyl, benzyl, phenethyl, hexahydrobenzyl, cyclohexyl, phenyl, tolyl, p-tert-butyl phenyl, naphthyl, and the like and where R′ is a short chain alkyl radical such as methyl, ethyl, propyl, butyl, etc., are a new family of valuable compounds. The new compounds are particularly effective anti-exposure cracking agents for natural and synthetic rubber goods. Of the new compounds the 6-ether substituted-2,2,4-trialkyl-1,2,3,4-tetrahydroquinolines wherein the 2,2,4-substituents are methyl radicals and the ether group is an alkoxy radical containing from 1 to 4 carbon atoms are particularly effective in the control of exposure cracking and represent a preferred embodiment of this invention.

The new anti-exposure cracking agents provided by this invention are the products of the hydrogenation of the corresponding 6-ether substituted-2,2,4-trialkyl-1,2-dihydroquinoline with an equimolecular amount of hydrogen in the presence of an effective hydrogenation catalyst, such as platinum, palladium or finely divided nickel. The hydrogenation may be conducted in the presence or absence of a saturated solvent incapable of being hydrogenated. Examples of operable solvents are cyclohexane, benzene, toluene, xylene, ethyl benzene, lower aliphatic alcohols, acetone, etc. The reaction is usually carried out at temperatures between room temperature and 200° C. and hydrogen pressures of from 300 to 700 pounds per square inch gauge pressure, however it may be accomplished at lower or higher temperatures and pressures. The extent of the hydrogenation may be readily followed by observing the decrease in pressure as hydrogen is consumed. The hydrogenation reaction is preferably continued until hydrogen has been consumed in an amount corresponding approximately to that theoretically required for conversion of the 1,2-dihydroquinoline to the 1,2,3,4-tetrahydroquinoline.

The 6-ether substituted-2,2,4-trialkyl-1,2-dihydroquinoline reactants employed in preparing the new compounds of this invention are obtained by condensing a para-ether substituted aniline

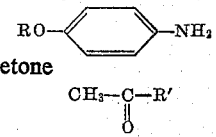

with a methyl ketone

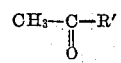

in a molar ratio of at least 1:2 in the presence of a suitable catalyst, e. g. iodine or bromine. It is now generally accepted that the condensation products of such primary amines with such methyl ketones are 1,2-dihydroquinolines of the structure

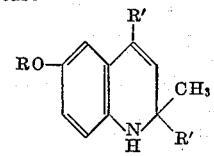

R and R′ having the same significance as aforedescribed.

As illustrative of the preparation of the new compounds of this invention is the following:

EXAMPLE

In a pressure autoclave 35.0 parts by weight (substantially 0.16 mole) of 6-ethoxy-2,2,4-trimethyl-1,2-dihydroquinoline (b. p. 123–125° C./2 mm.) is dissolved in 120 parts by weight of methanol and incorporated therein is 7 parts by weight of a 60% by weight suspension of finely divided nickel in mineral oil as the catalyst. While constantly agitating at room temperature and maintaining a pressure in the range of 450–635 pounds per square inch, hydrogen is admitted to the mix over a period of about 45 minutes, the temperature rising gradually to about 125° C. Thereupon the reaction mix is removed and filtered and the solvent removed by evaporation. 35.3 parts by weight of a light yellow liquid possessing a boiling point of 122° C./2 mm., comprising 6-ethoxy-2,2,4-trimethyl-1,2,3,4-tetrahydroquinoline, is obtained.

The following examples in tabular form are presented to illustrate the variety of new 1,2,3,4-tetrahydroquinolines which are prepared in accordance with the aforedescribed process.

*Products of the reaction of hydrogen with a 6-ether substituted-2,2,4-trialkyl-1,2-dihydroquinoline*

| Dihydroquinoline | Product |
| --- | --- |
| 6-methoxy-2,2,4-trimethyl-1,2-dihydroquinoline. | 6-methoxy-2,2,4-trimethyl-1,2,3,4-tetrahydroquinoline. |
| 6-isopropoxy-2,2,4-trimethyl-1,2-dihydroquinoline. | 6-isopropoxy-2,2,4-trimethyl-1,2,3,4-tetrahydroquinoline. |
| 6-n-propoxy-2,2,4-trimethyl-1,2-dihydroquinoline. | 6-n-propoxy-2,2,4-trimethyl-1,2,3,4-tetrahydroquinoline. |
| 6-n-butoxy-2,2,4-trimethyl-1,2-dihydroquinoline. | 6-n-butoxy-2,2,4-trimethyl-1,2,3,4-tetrahydroquinoline. |
| 6-n-hexoxy-2,2,4-trimethyl-1,2-dihydroquinoline. | 6-n-hexoxy-2,2,4-trimethyl-1,2,3,4-tetrahydroquinoline. |
| 6-benzoxy-2,2,4-trimethyl-1,2-dihydroquinoline. | 6-benzoxy-2,2,4-trimethyl-1,2,3,4-tetrahydroquinoline. |
| 6-naphthoxy-2,2,4-trimethyl-1,2-dihydroquinoline. | 6-naphthoxy-2,2,4-trimethyl-1,2,3,4-tetrahydroquinoline. |
| 6-benzyloxy-2,2,4-trimethyl-1,2-dihydroquinoline. | 6-benzyloxy-2,2,4-trimethyl-1,2,3,4-tetrahydroquinoline. |
| 6-methoxy-2,4-diethyl-2-methyl-1,2-dihydroquinoline. | 6-methoxy-2,4-diethyl-2-methyl-1,2,3,4-tetrahydroquinoline. |
| 6-ethoxy-2,4-diethyl-2-methyl-1,2-dihydroquinoline. | 6-ethoxy-2,4-diethyl-2-methyl-1,2,3,4-tetrahydroquinoline. |
| 6-ethoxy-2,4-di-n-propyl-2-methyl-1,2-dihydroquinoline. | 6-ethoxy-2,4-di-n-propyl-2-methyl-1,2,3,4-tetrahydroquinoline. |
| 6-ethoxy-2,4-di-isopropyl-2-methyl-1,2-dihydroquinoline. | 6-ethoxy-2,4-di-isopropyl-2-methyl-1,2,3,4-tetrahydroquinoline. |
| 6-ethoxy-2,4-di-n-butyl-2-methyl-1,2-dihydroquinoline. | 6-ethoxy-2,4-di-n-butyl-2-methyl-1,2,3,4-tetrahydroquinoline. |

As illustrative of the anti-exposure cracking properties in natural rubber vulcanizates of the new compounds of this invention rubber compositions are prepared utilizing the following ingredients:

| Stock | A | B | C | D | E |
|---|---|---|---|---|---|
| | Parts by weight | | | | |
| Smoked sheets rubber | 100 | 100 | 100 | 100 | 100 |
| Carbon black | 50 | 50 | 50 | 50 | 50 |
| Saturated hydrocarbon softener | 3 | 3 | 3 | 3 | 3 |
| Zinc oxide | 5 | 5 | 5 | 5 | 5 |
| Stearic acid | 3 | 3 | 3 | 3 | 3 |
| Sulfur | 2.5 | 2.5 | 2.5 | 2.5 | 2.5 |
| N-Cyclohexyl-2-benzothiazole sulfenamide | 0.8 | 0.8 | 0.8 | 0.8 | 0.8 |
| 6-Ethoxy-2,2,4-trimethyl-1,2-dihydroquinoline [1] | | 1.5 | | 3.0 | |
| 6-Ethoxy-2,2,4-trimethyl-1,2,3,4-tetrahydroquinoline | | | 1.5 | | 3.0 |

[1] 6-ethoxy-2,2,4-trimethyl-1,2-dihydroquinoline is a well-known anti-exposure cracking agent.

The ingredients are admixed on a rubber mill in the customary fashion and the respective compounded stocks are cured in a press at 142° C. for 30 minutes. Since evaluation under static conditions is not indicative of the service obtained with many types of rubber articles which must withstand flexing, the vulcanized compositions are evaluated under dynamic conditions in an atmosphere containing a definite concentration of ozone. Samples of the stocks are cured in the form of a belt ½″ wide, ¼″ thick and 5⅝₁₆″ diameter and mounted on 1″ diameter shafts. The ozone concentration is maintained at 20–30 parts per hundred million throughout the test and the shafts are rotated at 75 R. P. M. In this manner a momentary elongation through a range of 0–20% is provided at any portion of the test specimen passing over the shaft. (The apparatus and procedure employed is described in a paper of Creed et al. entitled "An Apparatus for the Evaluation of Ozone Protective Agents for Elastomers Under Dynamic Conditions" given at the Cincinnati, Ohio, meeting of the Rubber Division of the American Chemical Society May 1, 1952.) The experimental test specimens are compared visually at various intervals noting the extent of cracking. A stock which is severely cracked has no service life remaining in terms of the useful life of a rubber article and where the cracking is designated as extremely severe the degradation is well beyond even this point. The results of the tests are set forth below:

TABLE I

| Stock | Surface Cracking after Flexing in Ozone for— | | | |
|---|---|---|---|---|
| | 8 hrs. | 32 hrs. | 48 hrs. | 96 hrs. |
| A | slight | extremely severe. | extremely severe. | |
| B | none | very slight | slight | |
| C | do | none | very slight | |
| D | do | do | none | moderate. |
| E | do | do | do | slight. |

The new compounds of this invention are particularly useful in the control of exposure cracking of the sulfur-vulcanizable synthetic rubber-like materials prepared by the polymerization of a conjugated diene compound, either alone or with other unsaturated compounds copolymerizable therewith. The synthetic rubbers which may be substantially improved in ozone resistance are polymers of aliphatic conjugated dienes such as butadiene, isoprene, ethyl butadiene, piperylene, dimethyl butadiene, and the like either alone or with unsaturated mono-olefinic compounds which contain the $CH_2=C<$ group such as the vinyl aromatics, namely styrene, α-methyl styrene, nuclear substituted styrenes, monochlorstyrene, dichlorstyrene, divinyl benzene, vinyl naphthalene, vinyl biphenyl, vinyl carbazole, 2-vinyl-5-ethyl pyridine, etc., and such vinyl compounds as acrylonitrile, methacrylonitrile, acrylic acid, methacrylic acid, methyl vinyl ketone, and the like.

As illustrative of the control of exposure cracking of vulcanized sulfur-vulcanizable synthetic rubber-like materiols, a rubbery butadiene-1,3-styrene copolymer composition is prepared utilizing the following ingredients:

| Stock | F | G | H |
|---|---|---|---|
| | Parts by weight | | |
| GR-S 100 | 100 | 100 | 100 |
| Carbon black | 50 | 50 | 50 |
| Saturated hydrocarbon softener | 10 | 10 | 10 |
| Zinc oxide | 4 | 4 | 4 |
| Stearic acid | 2 | 2 | 2 |
| Sulfur | 1.75 | 1.75 | 1.75 |
| N-Cyclohexyl-2-benzothiazole sulfenamide | 1.20 | 1.20 | 1.20 |
| 6-Ethoxy-2,2,4-trimethyl-1,2-dihyroquinoline [1] | | 1.5 | |
| 6-Ethoxy-2,2,4-trimethyl-1,2,3,4-tetrahydroquinoline | | | 1.5 |

[1] 6-ethoxy-2,2,4-trimethyl-1,2-dihydroquinoline is a well-known anti-exposure cracking agent.

The ingredients are admixed on a rubber mill in the customary fashion and the respective compounded stocks are cured in a press at 144° C. for 30 minutes. The vulcanizates are then evaluated for cracking resistance as aforedescribed. The results of the tests are set forth below:

TABLE II

| Stock | Surface Cracking after Flexing in Ozone for— | | |
|---|---|---|---|
| | 8 hrs. | 32 hrs. | 56 hrs. |
| F | none | extremely severe | extremely severe. |
| G | do | very slight | moderate. |
| H | do | none | very slight. |

As further illustrative of rubber-like compositions exhibiting improved resistance to exposure cracking are sulfur-vulcanizable stocks comprising such synthetic rubbers as the rubbery copolymers of butadiene-1,3 and acrylonitrile (e. g. Hycar OR–15) and the rubber-like polymers of isobutylene with small amounts of diolefins such as isoprene (e. g. Butyl rubber), specific examples being

| | Parts by weight | |
|---|---|---|
| Butadiene-acrylonitrile rubber | 100 | |
| Isobutylene-isoprene rubber | | 100 |
| Carbon black | 60 | 54 |
| Zinc oxide | 5 | 5 |
| Stearic acid | 1 | 1 |
| Sulfur | 1.5 | 2 |
| 2,2-Dithiobisbenzothiazole | 1.5 | 4.0 |
| Lead oxide | | 5.0 |
| 6-Ethoxy-2,2,4-trimethyl-1,2,3,4-tetrahydroquinoline | 2.0 | 2.0 |

It is obvious from the foregoing that the new compounds of this invention are a class of compounds which substantially increase the life of natural and synthetic rubber goods. The new anti-exposure cracking agents disperse readily and rapidly in rubber stocks, both natural and synthetic.

Smaller amounts of the tetrahydroquinoline anti-exposure cracking agents may be employed than those indicated in the examples. Amounts as small as 0.2% by weight on the rubber (natural and synthetic) of the new compounds of this invention exhibit satisfactory anti-exposure cracking properties. Amounts higher than those specifically shown, as for example up to 5% by weight on the rubber, may be employed depending upon the nature of the tetrahydroquinoline as well as that of the rubber, the other compounding ingredients used and the objectives of the compounder.

By the term "a vulcanized rubber" as employed in the appended claims, unless otherwise modified, is meant natural as well as synthetic rubbers which are capable of vulcanization when heated with sulfur and includes latices and reclaims of such materials.

It is to be understood that other desired filling and compounding ingredients may be incorporated in the rubber base along with the anti-exposure cracking agent. For example, there may be incorporated other accelerators, softeners, etc. as well as the customary rubber antioxidants.

While the invention has been described with respect to certain specific embodiments it is not so limited and it is to be understood the variations and modifications thereof obvious to those skilled in the art may be made without departing from the spirit or scope of this invention.

What is claimed is:

1. A vulcanized rubber composition containing a 6-ether substituted - 2,2,4 - trialkyl - 1,2,3,4 - tetrahydroquinoline of the structure

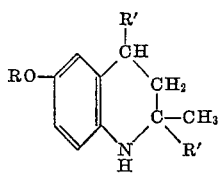

where R is a hydrocarbon radical and where R' is a short chain alkyl radical.

2. A vulcanized rubber composition containing a 6-alkoxy substituted - 2,2,4 - trimethyl - 1,2,3,4 - tetrahydroquinoline.

3. A vulcanized natural rubber composition containing a 6-alkoxy substituted-2,2,4-trimethyl-1,2,3,4-tetrahydroquinoline, the alkyl group of the alkoxy substituent containing from 1 to 4 carbon atoms inclusive.

4. A composition of matter comprising a vulcanized sulfur-vulcanizable synthetic rubber-like polymer, said polymer being prepared by the polymerization of a conjugated diene compound and, as an anti-exposure cracking agent therefore, a 6-alkoxy substituted-2,2,4-trimethyl-1,2,3,4-tetrahydroquinoline, the alkyl group of the alkoxy substituent containing from 1 to 4 carbon atoms inclusive.

5. A composition of matter comprising a vulcanized sulfur-vulcanizable synthetic rubber-like polymer, said polymer being prepared by the polymerization of a conjugated diene compound and an unsaturated mono-olefinic compound which contains the

group and is copolymerizable therewith, and, as an anti-exposure cracking agent therefor, a 6-alkoxy substituted-2,2,4 - trimethyl - 1,2,3,4 - tetrahydroquinoline, the alkyl group of the alkoxy substituent containing from 1 to 4 carbon atoms inclusive.

6. A composition of matter comprising a vulcanized sulfur-vulcanizable synthetic rubber-like polymer, said polymer being prepared by the polymerization of a butadiene-1,3 hydrocarbon, and, as an anti-exposure cracking agent therefor, a 6-alkoxy substituted-2,2,4-trimethyl-1,2,3,4-tetrahydroquinoline, the alkyl group of the alkoxy substituent containing from 1 to 4 carbon atoms inclusive.

7. A composition of matter comprising a vulcanized sulfur-vulcanizable synthetic rubber-like polymer, said polymer being prepared by the polymerization of a butadiene-1,3 hydrocarbon and a vinyl aromatic monomer copolymerizable therewith, and, as an anti-exposure cracking agent therefor, a 6 - alkoxy substituted - 2,2,4 - trimethyl - 1,2,3,4 - tetrahydroquinoline, the alkyl group of the alkoxy substituent containing from 1 to 4 carbon atoms inclusive.

8. A vulcanized rubber composition containing 6-ethoxy - 2,2,4 - trimethyl - 1,2,3,4 - tetrahydroquinoline, said rubber being natural rubber.

9. A vulcanized rubber composition containing 6-ethoxy - 2,2,4 - trimethyl - 1,2,3,4 - tetrahydroquinoline, said rubber being a butadiene-styrene copolymer.

10. A vulcanized rubber composition containing 6-ethoxy - 2,2,4 - trimethyl - 1,2,3,4 - tetrahydroquinoline, said rubber being a butadiene-acrylonitrile copolymer.

11. A vulcanized rubber composition containing 6-ethoxy - 2,2,4 - trimethyl - 1,2,3,4 - tetrahydroquinoline, said rubber being an isobutylene-isoprene copolymer.

12. A composition of matter comprising a vulcanized sulfur-vulcanizable rubber and as an antioxidant therefor, 6 - alkoxy - 2,2,4 - trimethyl - 1,2,3,4 - tetrahydroquinoline.

References Cited in the file of this patent

UNITED STATES PATENTS

| | | |
|---|---|---|
| 2,165,623 | Dunbrook et al. | July 11, 1939 |
| 2,194,399 | Lange | Mar. 19, 1940 |
| 2,387,751 | Dickey et al. | Oct. 30, 1945 |
| 2,500,229 | Arnold et al. | Mar. 14, 1950 |
| 2,507,485 | Vogt et al. | May 9, 1950 |
| 2,616,871 | Newby | Nov. 4, 1952 |
| 2,630,421 | Stamatoff | Mar. 3, 1953 |